United States Patent
Donovan et al.

[11] Patent Number: 6,062,263
[45] Date of Patent: May 16, 2000

[54] THREAD-FORMING PIPE PLUG

[75] Inventors: Steven P. Donovan, Roscoe, Ill.; William R. Turnmire, Sparta; Lawrence Hutson, Cookeville, both of Tenn.

[73] Assignee: Textron Inc., Providence, R.I.

[21] Appl. No.: 09/130,764

[22] Filed: Aug. 7, 1998

Related U.S. Application Data

[63] Continuation-in-part of application No. 08/784,049, Jan. 17, 1997.

[51] Int. Cl.[7] .................................................. F16L 55/10
[52] U.S. Cl. ............................ 138/89; 138/96 T; 220/289
[58] Field of Search ................................ 138/89, 96 R, 138/96 T; 215/356, 357, 364; 220/288, 289

[56] References Cited

U.S. PATENT DOCUMENTS

| | | | |
|---|---|---|---|
| Re. 17,528 | 12/1929 | Mersfelder et al. | 220/287 |
| Re. 17,667 | 5/1930 | Mersfelder et al. | 220/289 |
| Re. 18,100 | 6/1931 | Mersfelder et al. | 220/289 |
| 52,269 | 1/1866 | Connelly | 215/356 |
| 130,208 | 8/1872 | Frank | 215/356 |
| 190,224 | 5/1877 | Kromer | 217/107 |
| 597,000 | 1/1898 | Higbee | 285/333 |
| 658,313 | 9/1900 | Bernardi | 403/300 |
| 936,444 | 10/1909 | Gillon | 220/288 |
| 1,306,641 | 6/1919 | Steenstrup | 220/582 |
| 1,702,878 | 2/1929 | Mersfelder et al. | 220/289 |
| 2,009,679 | 7/1935 | Placide | 285/251 |
| 2,021,704 | 11/1935 | Thatcher et al. | 138/89 |
| 2,024,069 | 12/1935 | Sharp | 411/425 |
| 2,269,476 | 1/1942 | Poupitch | 411/312 |
| 2,352,540 | 6/1944 | Hanneman | 411/308 |
| 2,484,644 | 10/1949 | Poupitch | 411/311 |
| 3,089,603 | 5/1963 | Leslie-Smith | 215/356 X |
| 3,203,460 | 8/1965 | Kuhne | 411/263 |
| 3,351,115 | 11/1967 | Boehlow | 411/168 |
| 3,481,380 | 12/1969 | Breed | 411/309 |
| 3,527,136 | 9/1970 | Wilson | 411/423 |
| 3,633,455 | 1/1972 | Larson | 411/423 |
| 3,878,759 | 4/1975 | Carlson | 411/416 |
| 3,978,760 | 9/1976 | Muenchinger | 411/386 |
| 4,091,841 | 5/1978 | Beneker et al. | 138/89 |
| 4,331,414 | 5/1982 | Wheatley, Jr. | 411/311 |
| 4,430,036 | 2/1984 | Chapman | 411/416 |
| 4,487,228 | 12/1984 | Waldo et al. | 138/96 T |
| 4,503,934 | 3/1985 | Stephanus et al. | 138/89 X |
| 4,797,022 | 1/1989 | Crigger | 403/408.1 |
| 5,088,869 | 2/1992 | Greenslade | 411/386 |
| 5,289,851 | 3/1994 | Jorgensen | 138/89 |
| 5,680,954 | 10/1997 | Arnold et al. | 215/356 X |

*Primary Examiner*—Patrick Brinson
*Attorney, Agent, or Firm*—Trexler, Bushnell, Giangiorgi & Blackstone, Ltd.

[57] ABSTRACT

Disclosed is a combination plug and fastener for sealing in an opening in a workpiece. The combination plug and fastener includes a shank having a non-helical sealing portion and a threaded portion extending from the sealing portion. The threaded portion initially enters the opening, and engages with the internal wall of the opening providing a first seal. The sealing portion is configured to engage against the internal wall of the opening providing a second seal.

27 Claims, 12 Drawing Sheets

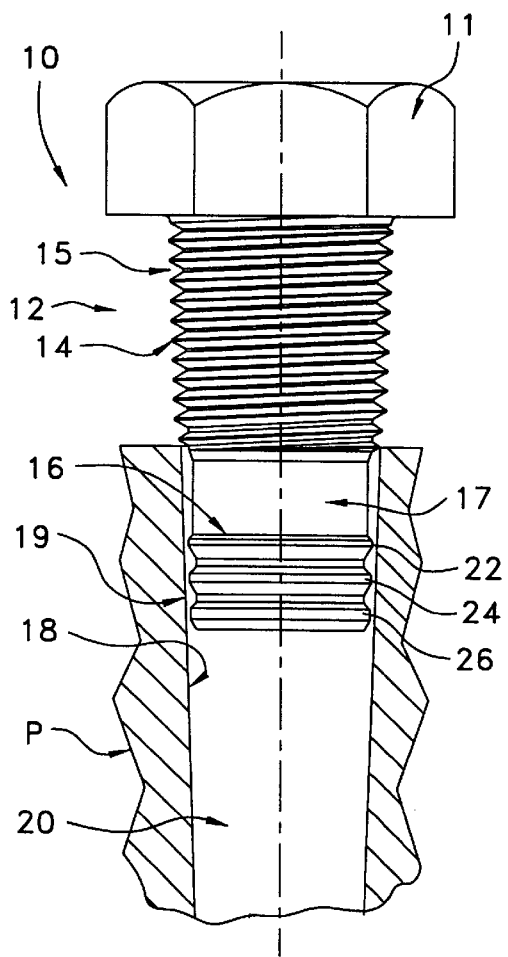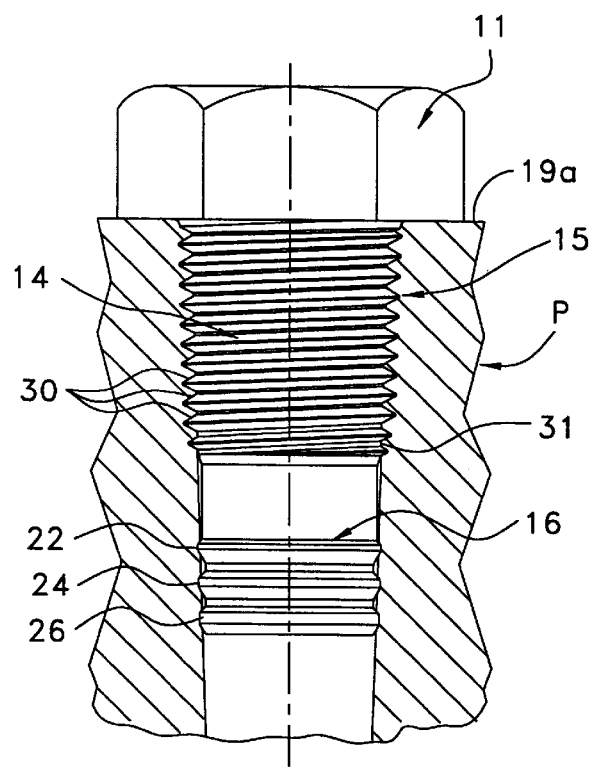
FIG. 1
FIG. 2

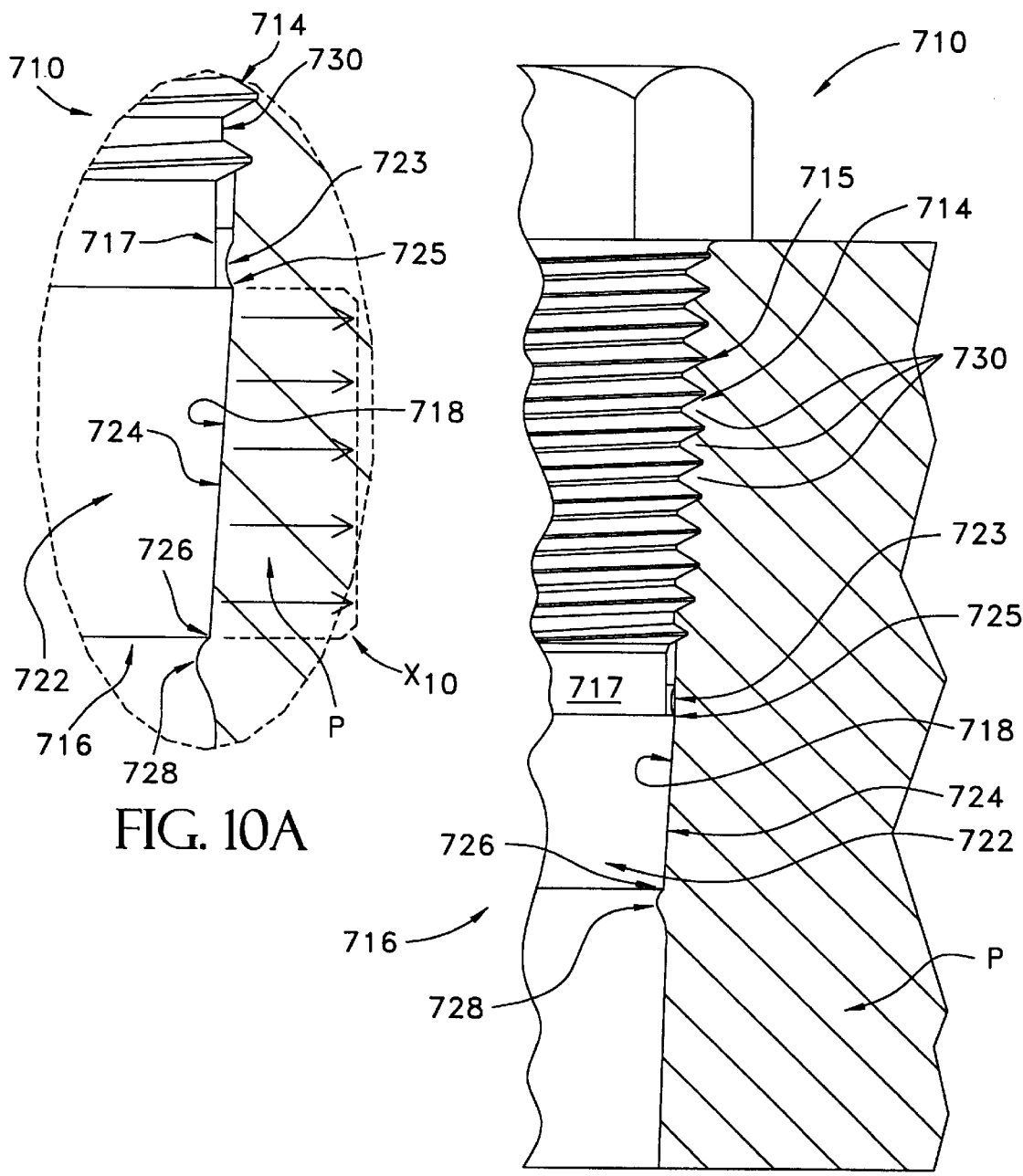

THREAD-FORMING PIPE PLUG

RELATED APPLICATION

The present application is a continuation-in-part application of co-pending U.S. patent application Ser. No. 08/784,049, filed Jan. 17, 1997.

BACKGROUND

The present invention relates to self-tapping fasteners, and more particularly to removable, self-tapping threaded pipe plugs that will provide a sealed plug with respect to fluids and liquids carried in the pipe, the pressure tight plug being attained preferably without thread sealing compounds.

National standards for pipe plug threads have been developed and are widely used, these are well known in the art and are referred to as National Pipe Thread standards—Fuel and oil, viz.,—NPTF standards. The standard tapered NPTF pipe plug has been developed for use in engagement with a pre-tapped pipe or workpiece. The pipe is prepared by first drilling a straight hole, which is then taper reamed to provide a tapered hole. Finally the tapered reamed hole is tapped with a NPTF tapered tap to provide an internally threaded, tapered aperture, the internal thread being formed to a prescribed, predetermined configuration. With the standard NPTF pipe plug, the roots of both the exterior and interior threads are truncated slightly more than the crests so that the roots have wider flats than the crests, which is designed to produce metal-to-metal contact and deformation occurring at the crests and roots coincident with threaded engagement, prior to attaining thread flank contact. The deformation of the crests of the internal and external threads provides a sealing action at both the major and minor diameters, in theory preventing spiral leakage through the threads. In practice, however, due to the capillary action of the fluid or gas carried in the pipe, a potential spiral leakage path exists along the helix of the screw thread, if deformation does not completely seal the spiral path.

One disadvantage of the standard NPTF pipe plug is that during installation of the NPTF plug into the pre-tapped hole cross-threading may occur, which results in an unsealed spiral path along the threads. The cross-threads may not be detected and thereby causes fluid leakage under pressure at the plug seal during service. When the cross-threading is detected, the joint often must be scraped or reworked, both of which are costly and time consuming.

SUMMARY

Accordingly, objects of the present invention include providing a pipe plug which can cold-form threads into a pipe wall and which assures fluid sealing of the pipe without use of thread sealing compounds, as well as allowing replacement in the pipe with a subsequently employed standard NPTF pipe plug, if necessary. Also, the present invention allows a sealed pipe plug to be formed with a less costly fabrication and assembly procedure, as the tapping of the pipe aperture prior to engagement of the plug is eliminated. Also, because the pipe plug of the present invention can engage an untapped internal wall and form the female NPTF threads as it is assembled, prevents cross-threading. Further, as will be discussed more fully hereinafter, a sealing portion on the plug of the present invention attains a positive seal, and augments that attained with the interengaged NPTF thread to assure a leak proof joint. Further, it is anticipated that the novel plug of the present invention can be used with an internally tapered opening in a workpiece, as well as with a non-tapered opening.

In accordance with the present invention, there is provided a combination plug and fastener for sealing in an opening formed in a workpiece. The combination plug and fastener includes a shank having a non-helical sealing portion and a threaded portion extending from the sealing portion. The threaded portion initially enters the opening, and engages with the internal wall of the opening providing a first seal. The sealing portion is configured to engage against the internal wall of the opening providing a second seal.

BRIEF DESCRIPTION OF THE DRAWINGS

FIG. 1 is a side view in section of a self-tapping pipe plug with sealing end portion thereof shown initially entering a tapered pipe or workpiece aperture;

FIG. 2 is a side view, again in section, similar to FIG. 1 showing completed engagement of the self-tapping plug and the seal attained by the sealing portion of the plug, as well as completion of cold-formed threading by the thread-forming portion of the plug fully inserted into the workpiece aperture;

FIGS. 4–10 are side views of six further thread-forming pipe plugs with six different configurations of the respective sealing tip portions thereof;

FIGS. 4a–10a are enlarged fragmentary views of the sealing formations produced in pipe apertures by the respective corresponding plugs shown in FIGS. 4–10, also showing the anticipated pre-stressing patterns;

DETAILED DESCRIPTION OF THE ILLUSTRATED EMBODIMENTS

Figure 3:
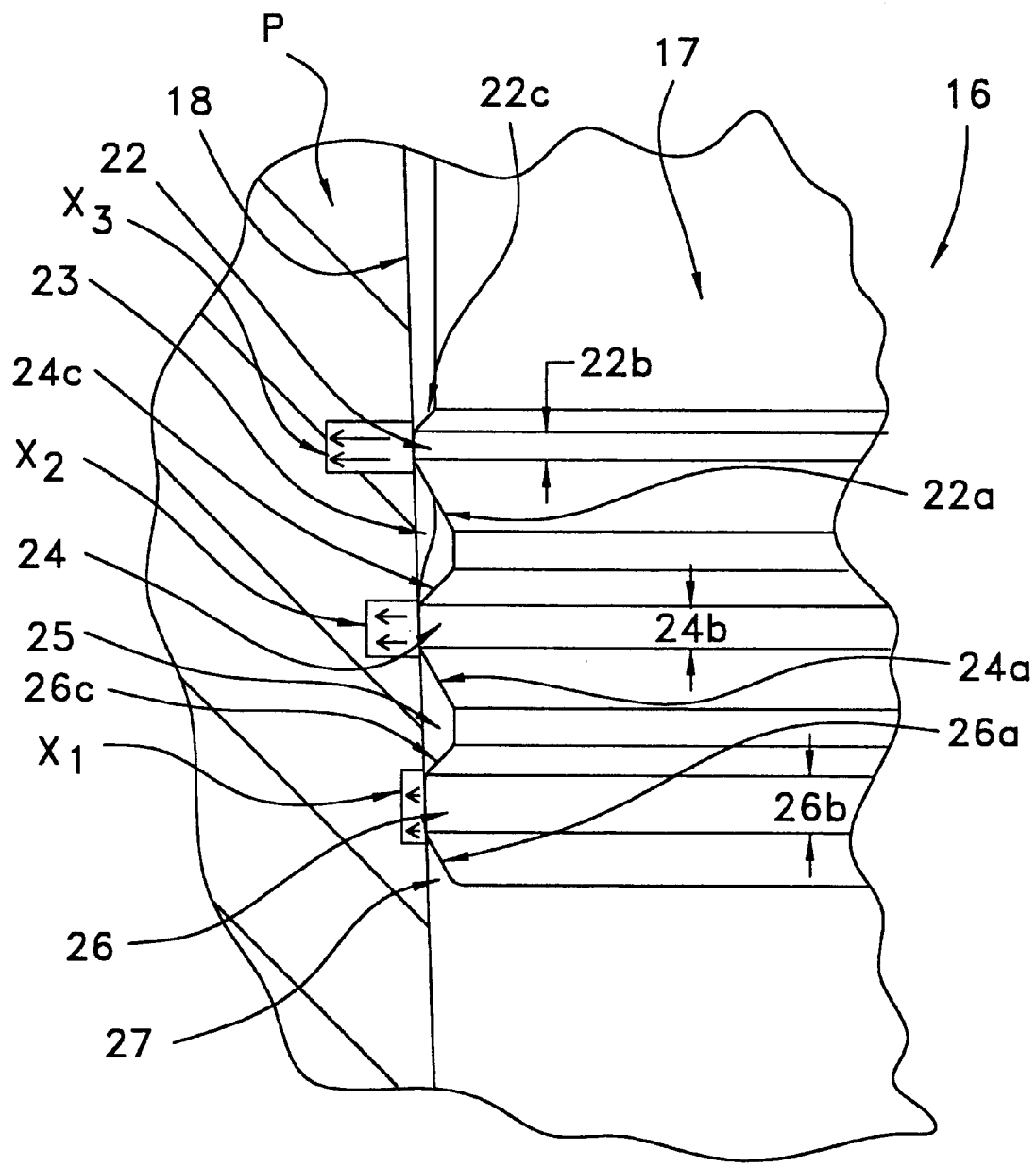
FIG. 3 is an enlarged, fragmentary view of the sealing formation of the plug sealing portion engaging the wall of the pipe hole shown in FIG. 2, and illustrating the anticipated radial pre-stress distribution.

Referring particularly to that which is illustrated in FIGS. 1–3, a pipe plug constructed in accordance with an embodiment of the present invention is generally indicated by reference character 10. The plug 10 has a tapered shank 12 which includes a tapered, thread-forming portion 14 from which a (progressively) tapered and unthreaded sealing end portion 16 extends. Between the thread-forming portion 14 and the driving head 11, there is provided a standard NPTF tapered thread formation 15. The thread-forming portion 14 may be of any known type of thread-forming configuration, such as a tri-lobular design. One such thread-forming design is well-known in the trade under the trademark TAPTITE®. Any type of thread-forming configuration for section 14 will be acceptable, and the tri-lobular TAPTITE® configuration is disclosed herein only by way of example, and not as a necessary element of the invention. In the embodiment illustrated in FIGS. 1–3, the threaded portions 14 and 15 conform to ⅛-27 standard NPTF pipe plug tap dimensions with a taper, for example of 1.7899°. The thread-forming portion 14 will cold-form internal threads to the NPTF mating standard in a smooth-reamed, tapered wall 18 of a pipe or workpiece P bore or hole 20. As shown in FIG. 1, the sealing end portion 16 of the plug 10 is initially insertable without engagement against the unthreaded opening mouth 19.

Since the NPTF standards are well known to those skilled in the art, the threads 14, 15 and 30 have not been shown to scale. It is to be understood that the thread-forming section 14 and full threads 15 are formed to a standard. The thread-forming portion 14 is designed to form an internal thread 30 in the tapered wall 18 of the pipe bore 20. The internal thread 30 thus formed is configured in accordance with the NPTF standard to be engaged by the threads 15, also formed to said selected NPTF standard. When the selected NPTF threads 15 and 30 are engaged, there will be produced metal-to-metal, interfering engagement between the respective crests and roots of threads 15 and 30 in accordance with said standard. This engagement results in a metal-to-metal seal along the spiral thread path. As such, it is to be understood that the threads 14, 15 and 30, as well as those thread configurations on the embodiment of FIGS. 4–10, are configured to NPTF standards, and are thus shown schematically.

As can be seen in FIG. 1, the sealing end portion 16 is spaced from the thread-forming portion 14 by a reduced diameter medial portion 17. In the embodiment of FIG. 1, the sealing end portion 16 includes three adjacently spaced sealing rings 22, 24 and 26 which have progressively reduced diameter to form a tapered relationship therebetween as best illustrated in the enlarged view of FIG. 3 (more fully described hereinafter).

Since the sealing rings 22,24,26 have sufficiently smaller diameter than the initial, decreasing bore diameter along the tapered pipe opening 19, there is no initial engagement therebetween as the thread-forming portion 14 begins to cold-form or swage the female thread turns 30 (FIG. 2) into the smoothly reamed tapered pipe wall 18,19, so that the sealing rings 22,24,26 do not initially engage the tapered wall and add drive load to the preliminary female thread-forming operation. However, as the thread-forming operation proceeds to the point where the drive head 11 approaches seating against the periphery of the pipe or workpiece opening mouth 19a, the sealing tip rings 22,24 and 26 progressively are driven into interference engagement against the tapered bore wall 18 of the pipe. Each ring progressively swages a respective annular sealing deformation 23,25 and 27 radially inwardly from the wall 18 against the angled lead face 22a,24a and 26a of the respective sealing rings 22,24 and 26 as shown in FIG. 3. The resulting annularly formed pipe wall deformation rings 23,25 and 27 provide three additional pressure seal formations which will completely seal the bore 18. Further, these deformations 23, 25 and 27 and the seals attained therewith, extend about the full inner circumference of the pipe or workpiece wall 18, that is about a full 360°. The seal provided by the end portion 16 should provide a complete sealing of the bore 20. The engagement of the end portion 16 with the tapered wall 18 serves to pre-stress the workpiece or pipe wall with the pre-stressing patterns being illustrated schematically at $X_1$, $X_2$ and $X_3$ in FIG. 3. Further, the engagement of the NPTF threads 15 with the female NPTF threads 30 formed by the thread-forming portion 14, will provide a standard NPTF type seal along the spiral leak path provided by the engaged threads. This seal along with that provided by the sealing end portion 16 assures that the plug will not leak.

Further, keeping in mind the above discussion regarding the method of fabrication with regard to the prior art NPTF design, the above disclosed invention is possessed of numerous advantages. First the tapping step for the internally tapered bore is eliminated, as the self-tapping portion 14 on the plug will form the tapered internal thread 30 in the workpiece. Secondly, as the female or internal NPTF thread 30 is formed as the plug is engaged with the workpiece, there is no danger of cross-threading. Accordingly, the reworking and waste associated with the prior art method of fabrication is eliminated. Also, it should be noted that the engagement of the sealing end portion 16 with the wall 18 of the workpiece bore 19 serves to pre-stress the workpiece, as illustrated at $X_1$–$X_3$ to permit said pipe or workpiece P to better withstand internal pressures and also prevent leakage.

Referring again to FIG. 2, since the female thread turns 30 have a cold-formed or swaged minor diameter which is smaller than the diameter of the original smooth wall from which the mating threads were created, the smallest formed female mating diameter 31 formed is nevertheless larger than the outer diameter of the largest seal ring 22. The three seal rings 22,24 and 26 can then be withdrawn with clearance past the smallest minor diameter 31 of the formed female threads 30 which will, therefore, not be disturbed or deformed when the plug 10 is entirely unthreaded and removed from the pipe or workpiece. Accordingly, the female threads 30 remain intact so that the plug 10 or any replacement NPTF pipe plug having standard NPTF threads can be threaded into the female threads 30 for re-sealing the pipe. That is to say, engagement of a standard NPTF plug will attain thread deformation and the expected NPTF type seal, which is not as efficient as the dual seal attained with the present invention.

Referring again to FIG. 3, in the illustrated embodiment of the plug 10, the end portion sealing rings 22,24 and 26 are disposed in a tapered relationship matching the taper of the originally smooth pipe side wall 18, for example, approximately 1.7899° relative to the pipe axis (not shown). The respective rings 22, 24 and 26 are separated by lesser diameter land portions that cooperate with the rings to define a series of spaced grooves. In order to roll form these annular sealing rings 22,24,26 simultaneously in a single operation with the formation of threads 14 and 15, the volume of the material in the rings should preferably be equal to each other. In order to achieve such equal ring volume, and produce the tapered relationship of the rings with relatively converging outer diameters, the longitudinal widths of the rings increase inversely relative to the converging decrease in outer diameters so that the sealing ring 26 has the smallest outer diameter with the largest longitudinally flat width 26b. The leading faces 22a,24a and 26a of the respective rings, preferably form an angle of approximately 45° relative to the respective face width 22b,24b and 26b in order to help minimize the resistance between these front faces as the seal rings 22,24,26 embed and swage the pipe wall 18 to form the annular internal wall deformation rings 23,25 and 27. The respective annular trailing faces 22c,24c and 26c can form angles of approximately 30° relative to the respective ring widths 22b,24b and 26b as shown in FIG. 3. As such, referring to the pre-stress patterns $X_1$–$X_3$, the forward most area of pre-stressing $X_1$ is the widest with the area $X_3$ the narrowest. The degree of pre-stressing is greater in area $X_3$ than at area $X_1$ due to the fact that the extent of radial interference is greater at area $X_3$ than area $X_1$ and the force is concentrated over a smaller area at $X_3$.

Figure 4:
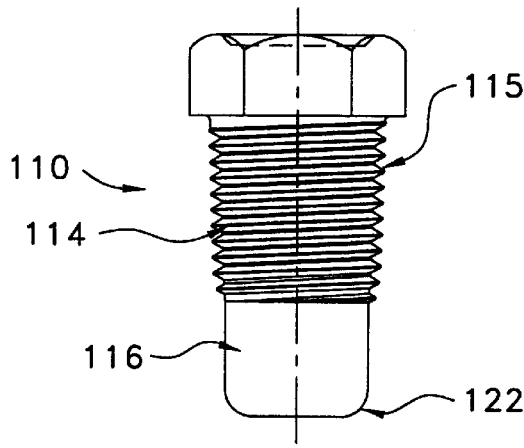
Figure 4A:
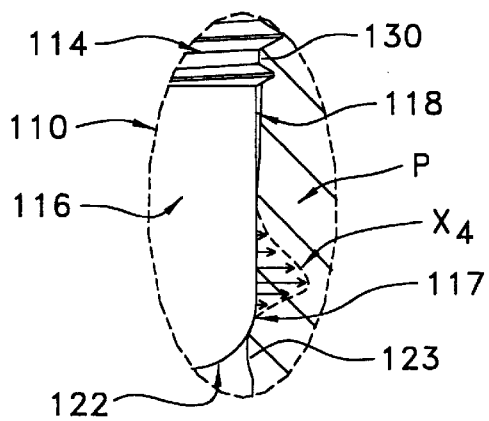

Referring now to FIGS. 4 and 4a, a second embodiment of a pipe plug construction in accordance with the present invention is generally indicated by reference character 110. In this embodiment of the pipe plug, the unthreaded sealing end portion 116 is a smooth cylindrical shank portion of reduced diameter extending without taper from the tapered, thread-forming portion 114. The threaded portion 115, similar to the threads 15 of the embodiment of FIGS. 1–3, is a standard NPTF thread. The operation of sections 114 and 115 correspond to those of sections 14 and 15 of the FIGS. 1–3 embodiment and as such these functions are not discussed in detail. The end of the sealing tip 118 has a rounded rim 122 in order to minimize initial interference with the taper bore wall 118 (FIG. 4*a*) as the thread-forming portion 114 begins cold-forming the female thread turns 130 (FIG. 4*a*) into the pipe wall 118. As shown in FIG. 4*a*, the annular lead side wall portion 117 of the cylindrical sealing tip portion 116 will be interference engagement with wall 118 and will cold-form or swage an annular, 360°; sealing deformation 123 radially inwardly from the tapered bore wall 118 to produce a leading pressure seal formation as the thread-forming portion 114 completes cold-forming the female thread turns 130 and the NPTF threads 115 engage the internal NPTF threads 130 formed by thread-forming portion 114. The sealing deformation 123 provides assured sealing of the sealing end 116 against the tapered pipe wall 118 to prevent leakage upstream of the spiral leak path through the thread turns 130 formed in the pipe bore wall 118. The pre-stressing pattern of the bore wall 118 attained with this embodiment is illustrated at $X_4$, FIG. 4*a*.

Figure 5:
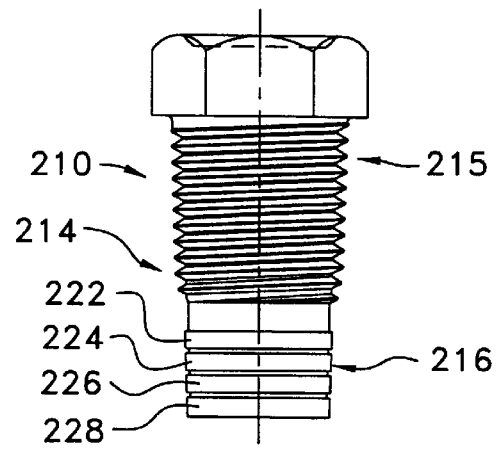
Figure 5A:
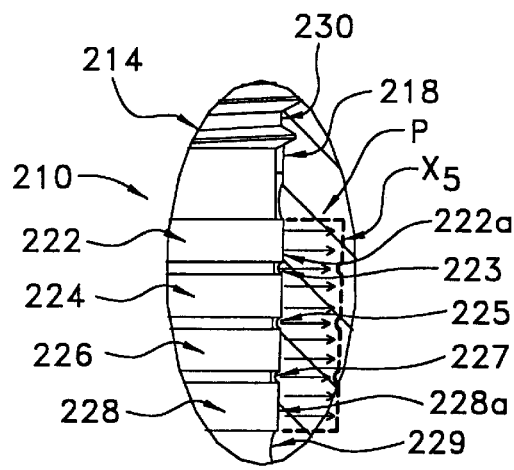

Referring now to FIGS. 5 and 5*a*, a third embodiment 210 of the pipe plug in accordance with the present invention is shown in which the sealing end portion 216 includes four spaced sealing rings 222,224,226 and 228. The sealing rings form a tapered relationship so that the sealing ring 228 has the smallest peripheral diameter 228*a* and the ring 222 has the largest peripheral diameter 222*a*. The sealing rings 222,224,226 and 228 perform swaging deformation of the pipe bore wall 218 to form annular, 360° pipe wall deformation rings 223,225,227 and 229 which add additional pressure seal augmenting the seal formation of the formed female pipe wall threads 230 against the thread-forming portion 214 of the plug, without however the fabrication complexity of the angled leading and trailing faces provided on the sealing rings 22,24 and 26 of the first pipe plug embodiment 10 shown in FIGS. 1–3. The prestressing pattern attained with the end portion 216 is shown at $X_5$.

Figure 6:
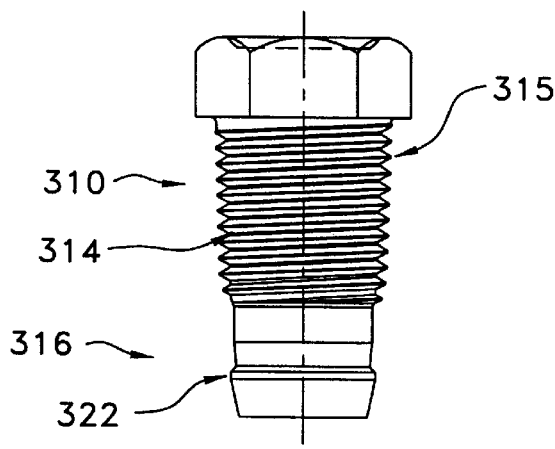
Figure 6A:
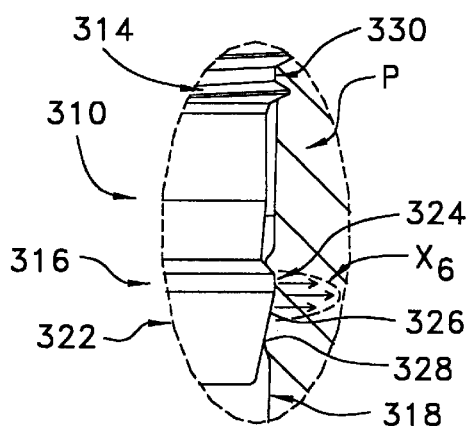

The embodiments of FIGS. 5 and 5*a*, as well as those of FIGS. 6–9 and 6*a*–9*a*, are similar to those of FIGS. 1–3 and 4 and 4*a* with respect to the general fastener design in that all include a driving end portion in the form of a driving head and a threaded shank. The threaded shank is divided in two portions 214 and 215 (FIGS. 6 and 6*a*). Similar to portions 14 and 15 of FIGS. 1–3. The thread-forming portions 214; 314 etc. are of the general type and kind disclosed with respect to portion 14, FIGS. 1–3, that is of a tri-lobular configuration. Here again, the type of thread-forming configuration used with respect to these embodiments is not critical to the invention. As an alternate to the tri-roundular tri-lobular configuration discussed for any of the disclosed embodiments, the thread-forming sections 14; 114; 214 etc. could be of five (5) lobe design, or any other thread-forming configuration, many others of which are well known in the art. All that is required is that the thread-forming portions 14; 114; 214, etc., be capable of forming a standard NPTF internal thread 30; 130; 230 in wall 119; 119 etc. Correspondingly, the thread portion 15; 115; 215, etc., are of a standard NPTF configuration designed to mate with the internal NPTF threads formed by the thread-forming portions 14; 114; 214, etc. Accordingly, with regard to the discussion that follows regarding the remaining embodiments of FIGS. 6–9, while the respective thread portions 314; 414, etc.; 315; 415, etc. and 330; 430 are designated, they will not be discussed in detail and it is to be understood that these threaded portions correspond and function as do sections 14, 15 and 30, FIGS. 1–3. Only the novel configuration of the respective sealing end portions 316; 416, etc. will be discussed in detail.

With the above in mind, reference is now directed to FIGS. 6 and 6*a*, wherein a fourth embodiment of a pipe plug, designated 310, in accordance with the present invention includes a sealing end portion 316 having a single sealing ring 322. The sealing ring 322 has a generally narrow uniform cylindrical peripheral surface 324 as best shown in FIG. 6*a*. The peripheral surface 324 has a conically tapered leading face 326 against which the ring 322 swages an annular, 360°, a sealing deformation ring 328 radially inwardly from the taper pipe wall 318. The longitudinal taper of the conical lead face 326 promotes an extended surface for engagement of the extended bore wall deformation 328 for assured seal by the sealing tip 316 and prevention of any spiral leak through the cold-formed female pipe thread turns 330 by the plug thread-forming portion 314. The pre-stress pattern is illustrated at $X_6$, FIG. 6*a*. As can be seen, the pre-stressing is greatest proximate the land or cylindrical surface 324, and tapers off toward the end of the sealing portion 316. Here again, the seal provided by the interfering engagement of sealing portion 316 with bore 318 and the deformation thereof at 328 provides a pressure seal that enhances the overall sealing action and works in tandem with the seal provided by the engagement of standard NPTF threads 315 and 330.

Figure 7:
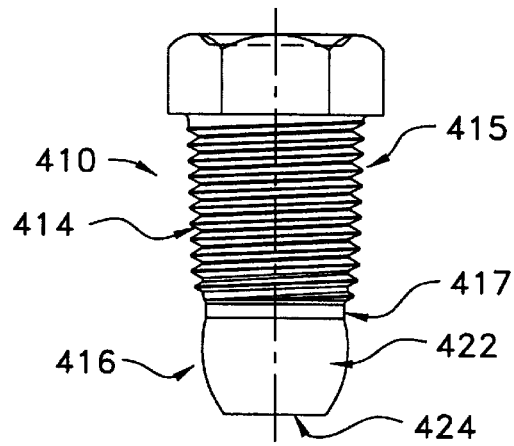
Figure 7A:
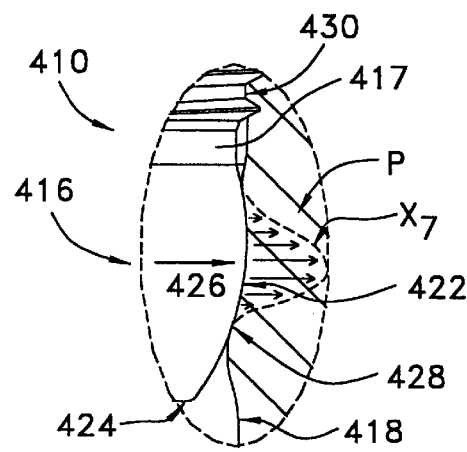

Referring now to FIGS. 7 and 7*a*, a fifth embodiment 410 of a pipe plug in accordance with the present invention has a sealing end portion 416 which has a generally bulbous or otherwise curved peripheral surface 422 formed in truncate extension from a reduced shank portion 417 at one end and a truncate end surface 424 at the terminal end of the plug. The peripheral surface 422 may be generally spherical, or elliptical, or merely generated from any curved surface. The arcuate sealing surface 422 cold-forms the wall 418 to produce a swaged or sheared annular, 360°, sealing deformation 428. The maximum diameter 426 of the arcuate sealing tip surface 422 is smaller than the minor diameter of the smallest female thread turn cold-formed by the thread-forming plug portion 414 to enable withdraw clearance of the sealing tip portion 416 through the formed female thread turns 430 to enable plug removal without disturbance of the formed female pipe threading turns. The pre-stressing pattern of wall 418 is illustrated at $X_7$.

Figure 8:
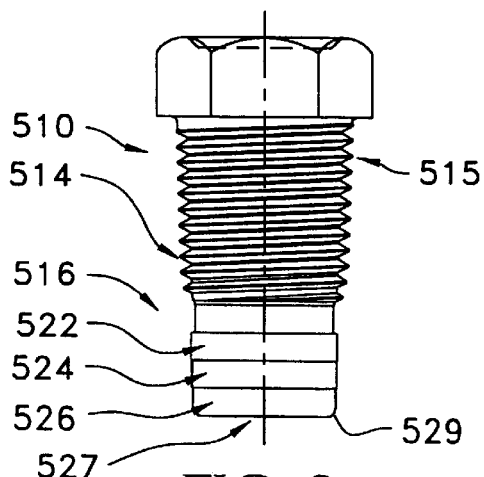
Figure 8A:
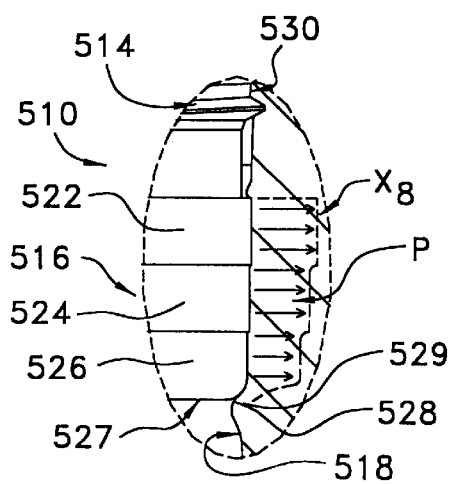

In FIGS. 8 and 8*a*, a sixth embodiment 510 of a pipe plug in accordance with the present invention is illustrated as having a sealing end portion 516 including three cylindrically formed sealing rings 522,524 and 526. The sealing rings 522,524 and 526 are serially contiguous or stepped with progressively reduced respective diameters to form an incrementally tapered relationship therebetween converging toward the planar terminal end 527 of the fastener. This end 527 has a rounded end rim 529 against which a swaged annular wall deformation from the tapered pipe bore wall 518 provides the pressure seal at the plug sealing tip portion 516. The sealing rings 522, 524, 526 produce progressively increasing interference and deformation of the bore wall 518. Thus, the pre-stressed pattern as illustrated at $X_8$ is attained. The seal achieved with the end portions 516 work with the standard NPTF seal achieved with the engagement of threads 515 and 530 to assure that the plug does not leak.

Figure 9:
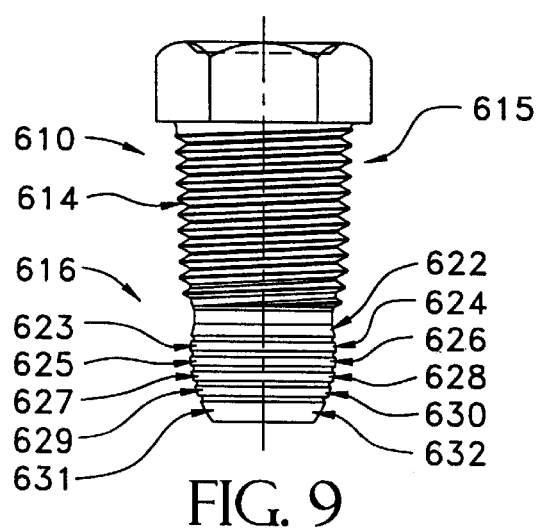
Figure 9A:
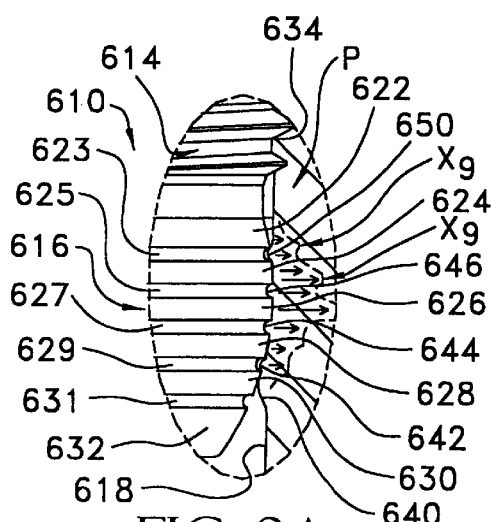

In FIGS. 9 and 9*a* a seventh embodiment is shown. This seventh embodiment 610 of a pipe plug in accordance with the present invention has a sealing tip portion 616 in which an annular, arcuate side wall surface is portioned into six annular rings 622,624,626,628,630 and 632 which are narrowly spaced by respective annular recesses or grooves 623,625,627,629 and 631. The spacing grooves provide generally sharp lead edges on the respective sealing rings which bite into the tapered bore wall 618 to form a series of annular sealing deformations 640,642,644,646 and 650 and a plurality of additional pressure seal formations which completely eliminate any potential spiral leak path between female thread turns 630 formed into the pipe bore and the thread-forming portion 614 of the pipe plug 610. The pre-stressing pattern achieved with end portion 616 is shown at $X_9$.

Referring now to FIGS. 10 and 10a, an eighth embodiment 710 for a pipe plug in accordance with the present invention has a sealing end portion 716 having a single, elongate sealing ring 722. The sealing ring 722 has a generally elongate, conically tapered peripheral surface 724 and a generally sharp-edged, annular leading rim 726 which bites into the tapered bore wall 718 to shear or swage an annular sealing ring deformation 728 radially inwardly from the wall 718. The sealing deformation 728 forms an additional pressure seal against the rim 726 and the elongate conical wall 724 provides extended seal surface against tapered wall 718 which combine to completely eliminate any potential spiral leak path between the female thread turns 730 formed into the tapered pipe wall 718 in the thread-forming portion 714 of the plug 710. A backwardly sheared, annular sealing deformation 723 is also formed at the rear, sharpened-edge annular rim 725 of the conical sealing tip wall 724. Radial clearance for the rear seal deformation 723 is provided by the reduced diameter medial shank portion 717 of the plug 710. Here again the pre-stress pattern has been illustrated schematically, and is indicated at $X_{10}$.

While the sealing end portion 16; 116 . . . 716, have been illustrated in conjunction with a self-threading or tapping plug 10, several alternatives should be kept in mind. First, the plug or plugs 10, 110 . . . 710 may be employed without the sealing end portion 16; 116 . . . 716. Further, the sealing end portion 16; 116 . . . 716 are not limited to use on the self-threading plug 10; 110 . . . 710 of the present invention, but may be used on standard NPTF plugs that are not self-tapping and are engaged in pre-tapped pipe on workpiece apertures.

FIGS. 11–24 illustrate several combination plug and fasteners 810, 910, 1010 and 1110 which are in accordance with still further embodiments of the present invention. As shown, each respectively includes a sealing portion 816, 916, 1016 and 1116 located between a head portion 811, 911, 1011 and 1111 and a threaded portion 814, 914, 1014 and 1114, with the head portion 811, 911, 1011 and 1111 being at one end of the plug and fastener 810, 910, 1010 and 1110, and the threaded portion 814, 914, 1014 and 1114 being at the other, opposite end of the plug and fastener 810, 910, 1010 and 1110. Each plug and fastener 810, 910, 1010 and 1110 is configured such that the respective threaded portion 814, 914, 1014 and 1114 is meant to initially enter an opening 19 in a workpiece P, and the sealing portion 816, 916, 1016 and 1116 follows the threaded portion 814, 914, 1014 and 1114 into the opening 19. When each plug and fastener 810, 910, 1010 and 1110 is fully engaged in the opening (shown in FIGS. 12, 14, 16, 18, 20, 22 and 24), the respective threaded portion 814, 914, 1014 and 1114 engages an internal wall of the opening 19 to form a first seal, and the sealing portion 816, 916, 1016 and 1116 engages an internal wall of the opening to form a second seal.

Each of the combination plug and fasteners 810, 910, 1010 and 1110 will now be described individually, pointing out differences between them. The plug and fastener 810 illustrated in FIGS. 11–16 includes a tapered threaded portion 814 as well as a tapered sealing portion 816. The sealing portion 816 includes a pair of sealing rings 822, 824, where the respective diameters 823, 825 of the rings 822, 824 differ from each other and taper or converge toward the threaded portion 814. In other words, the diameter 825 of sealing ring 824 which is closer to the threaded portion is smaller diameter than the diameter 823 of sealing ring 822 which is closer to the head portion 811. Additionally, a longitudinal width 824b of the sealing ring 824 which is closer to the threaded portion 814 is larger than a longitudinal width 822b of the sealing ring 822 which is closer to the head portion 811. In other words, the sealing rings 822 and 824 have peripheral surfaces which have differential longitudinal widths 822b and 824b, respectively, which are inversely proportional to their respective outer diameters 823 and 825. Preferably, the leading faces 822a and 824a of the respective rings 822 and 824, form an angle of approximately 45° relative to the respective widths 822b and 824b in order to help minimize resistance as the seal rings 822, 824 embed and swage an internal surface of the opening 19, as will be described (for clarity, reference numerals 822, 824, 822a, 824a, 822b and 824b are indicated only in FIG. 11).

Figure 11:
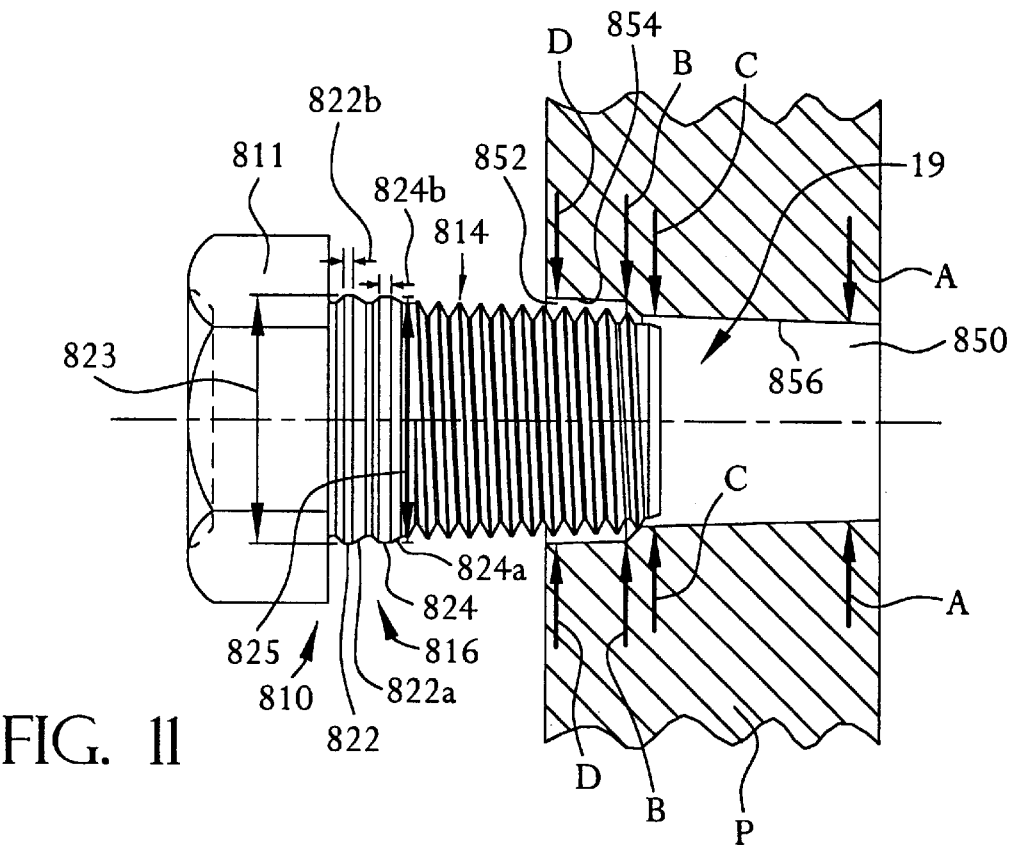
FIGS. 11, 13, 15, 17, 19, 21 and 23 are side, cross-sectional views of several different plug and fasteners which are in accordance with different embodiments of the present invention, showing each plug and fastener initially entering an opening in a workpiece.
Figure 12:
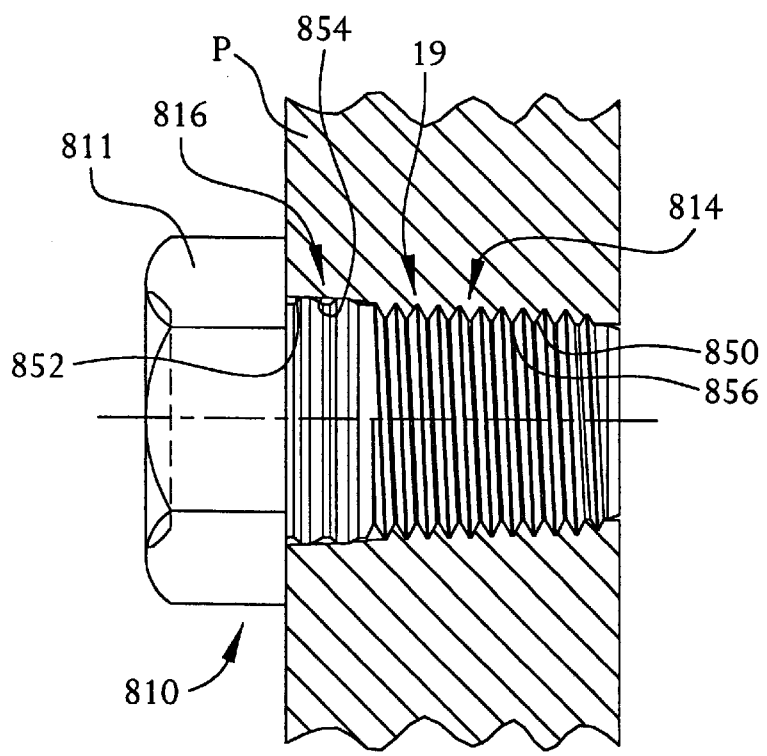
FIGS. 12, 14, 16, 18, 20, 22 and 24 are side, cross-sectional views showing the plug and fastener of FIGS. 11, 13, 15, 17, 19, 21 and 23, respectively, fully engaged in the opening in the workpiece.

As shown in FIGS. 11 and 12, the plug and fastener 810 may be engaged in an opening 19 in a workpiece P where the opening is formed of a tapered bore 850 and tapered counter bore 852. The bore 850 and counter bore 852 are tapered in that, as indicated in FIG. 11, diameter A of bore 850 is less than corresponding diameter C, and diameter B of counter bore 852 is less than corresponding diameter D.

Figure 13:
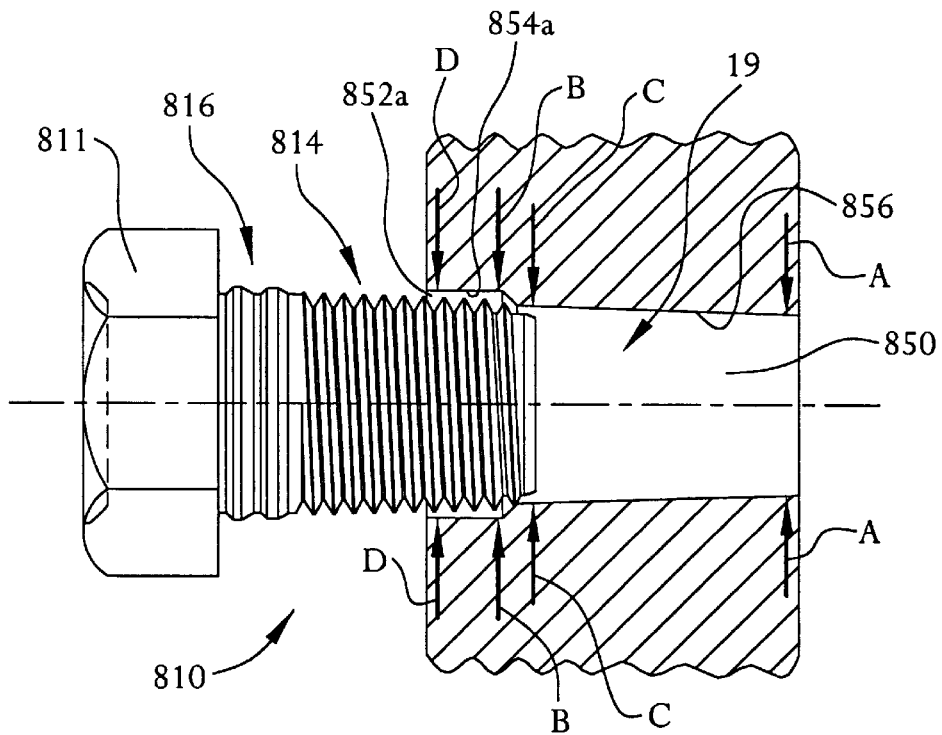
Figure 14:
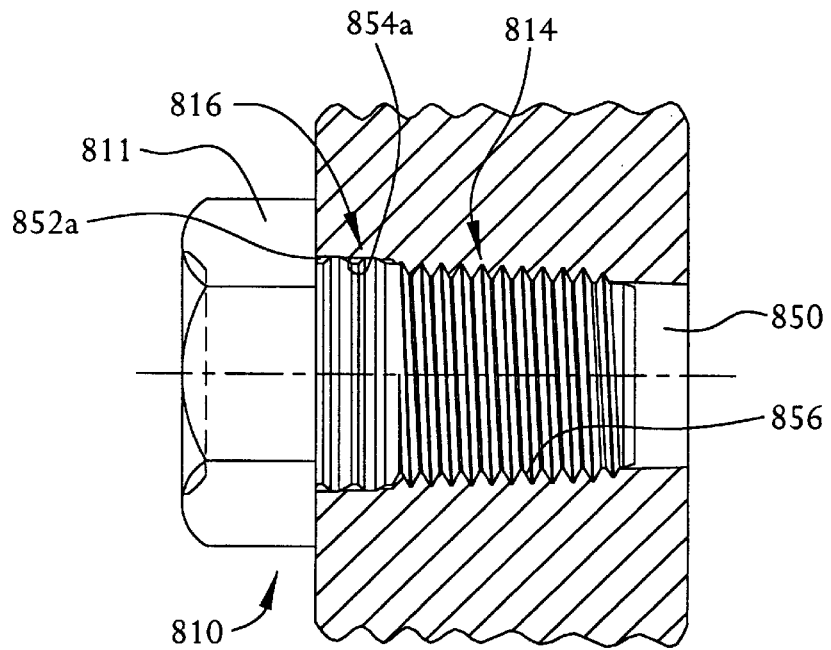
Figure 15:
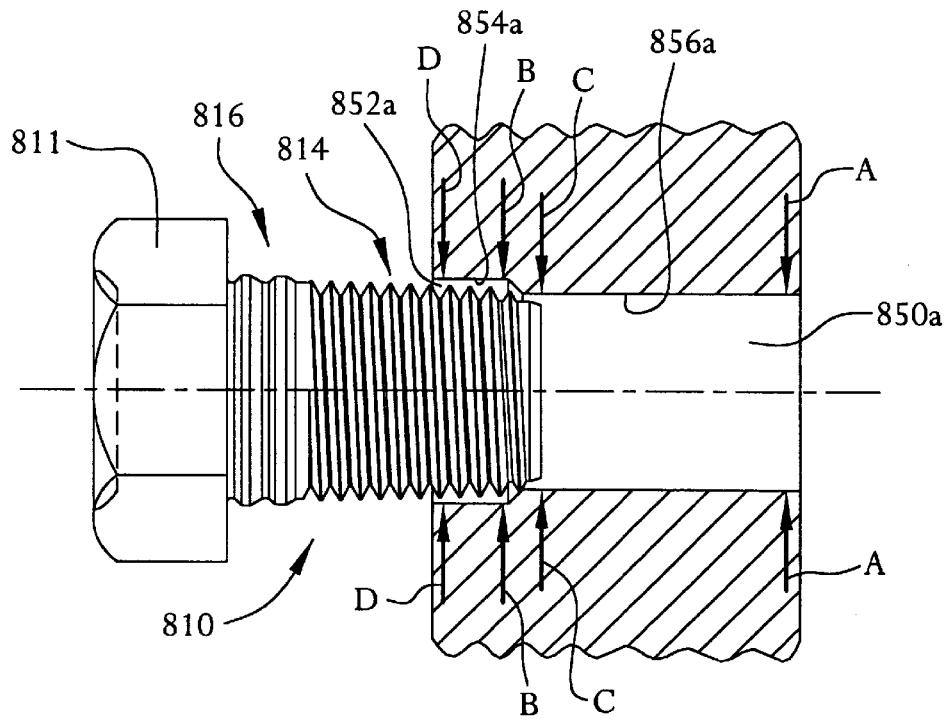
Figure 16:
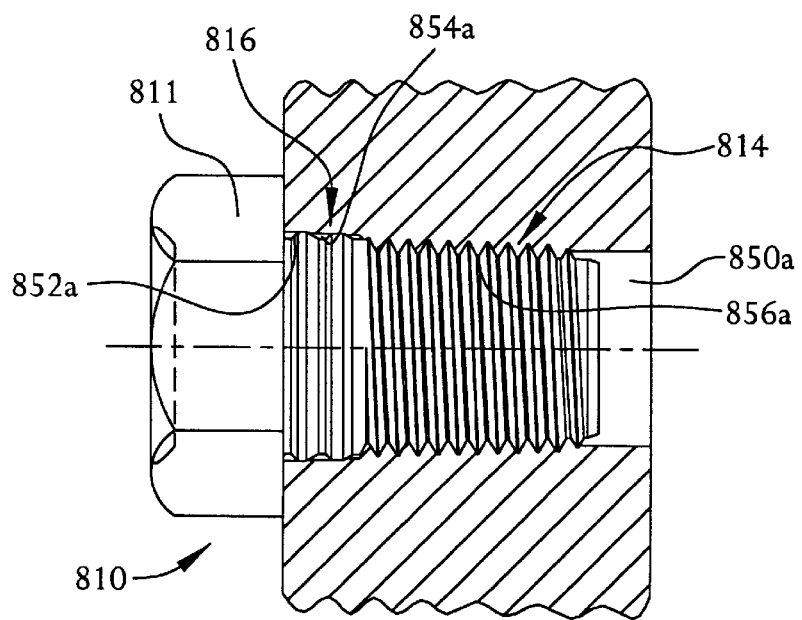

Alternatively, as shown in FIGS. 13 and 14, the plug and fastener 810 may be engaged with an opening 19 in a workpiece P where the opening is formed of a tapered bore 850 and non-tapered counter bore 852a. As shown in FIG. 13, diameters B and D of the counter bore 852a are substantially equivalent while diameter A of bore 850 is less than diameter C. Still further, as shown in FIGS. 15 and 16, the plug and fastener 810 may be engaged in an opening in a workpiece P where the opening is formed of a non-tapered bore 850a and a non-tapered counter bore 852a. In this case, as shown in FIG. 15, diameters A and C of the bore 850a are substantially equivalent, and so are diameters B and D of the counter bore 852a.

Regardless of the shape of the opening 19 and the dimensions of the bore 850, 850a and counter bore 852, 852a, when the combination plug and fastener 810 is initially inserted into the opening 19, as shown in FIGS. 11, 13 and 15, the threaded portion 814 is initially inserted therein. Because the counter bore 852, 852a has a larger diameter (diameters B and D in each of FIGS. 11, 13 and 15) than does the threaded portion 814 of the plug and fastener 810, the threaded portion 814 does not engage an internal wall 854, 854a of the counter bore 852, 852a and instead proceeds to engage an internal wall 856, 856a of the bore 850, 850a as the plug and fastner 810 is engaged in the opening. Because the threaded portion 814 of the plug and fastener 810 does not engage the internal wall 854, 854a of the counter bore 852, 852a, no potential spiral leak path is formed thereon by the threaded portion 814.

As shown, preferably the internal wall 856, 856a of the bore 850, 850a is provided as being initially unthreaded. Hence, the threaded portion 814 of the plug and fastener 810 forms threads on the internal wall 856, 856a of the bore 850, 850a as the threaded portion 814 engages therewith.

Alternatively, it is possible to provide that the internal wall 856, 856a of the bore 850, 850a is pre-threaded.

As shown in FIGS. 12, 14 and 16, as the plug and fastener 810 further advances in the opening 19, the sealing portion 816 engages the internal wall 854, 854a of the counter bore 852, 852a much like the engagement of the sealing portions of the plugs previously described. When the plug and fastener 810 is fully engaged in the opening 19, the engagement between the threaded portion 814 of the plug and fastener 810 and the internal wall 856, 856a of the bore 850, 850a provides a first seal, and the engagement between the sealing portion 816 of the plug and fastener 810 and the internal wall 854, 854a of the counter bore 852, 852a provides a second seal. Because the sealing rings 822 and 824 (as mentioned, for clarity, reference numerals 822 and 824 are shown only in FIG. 11) do not comprise one continuous helical sealing structure, the sealing portion 816 of the plug and fastner 810 does not provide a helical leak path along the internal wall 854, 854a of the counter bore 852, 852a.

The combination plug and fasteners 910 and 1010 illustrated in FIGS. 17–20 differ from plug and fastener 810 only in that plug and fasteners 910 and 1010 include threaded portions 914, 1014 which are not tapered. The sealing portions 916 and 1016 of the plug and fasteners 910 and 1010, respectively, are identical to the sealing portion 816 of plug and fastner 810, and provide a pair of sealing rings having the same structure of the sealing rings 822 and 824 of sealing portion 816. Additionally, like the plug and fastener 810, each plug and fastener 910 and 1010 includes a head portion 911 and 1011, respectively, where the sealing portion 916 and 1016 is located between the head portion 910 and 1010 and the threaded portion 914 and 1014.

Figure 17:
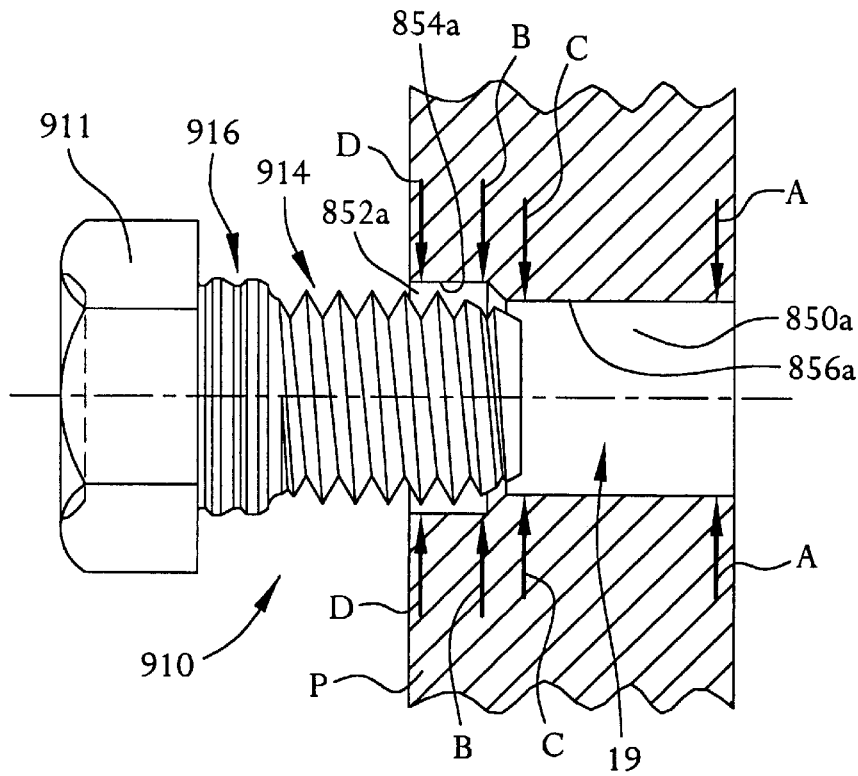
Figure 18:
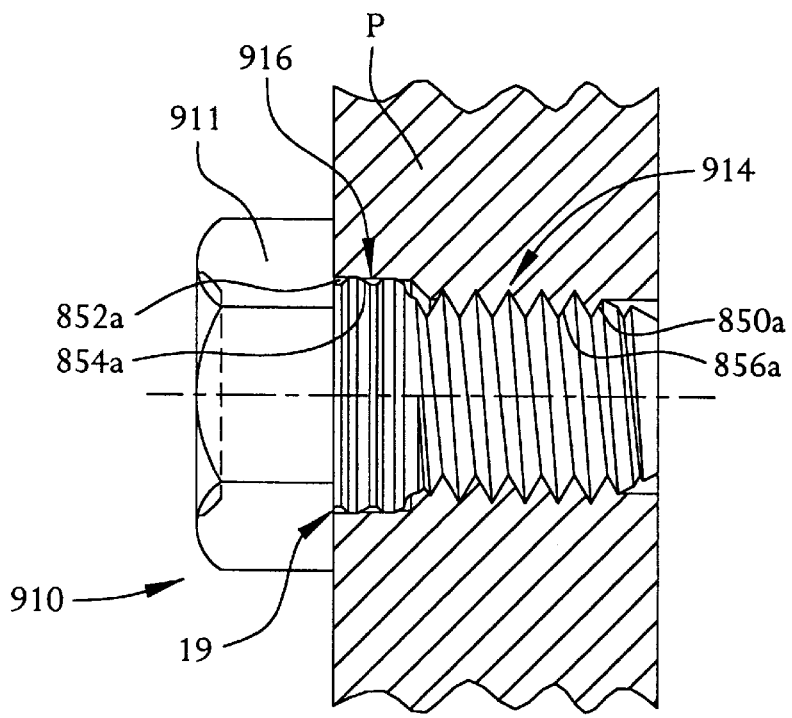

As shown in FIGS. 17 and 18, plug and fastener 910 can be engaged with an opening 19 in a workpiece P where the opening is formed of a non-tapered bore 850a and non-tapered counter bore 852a. In this case, as shown in FIG. 17, diameters A and C of bore 850a are substantially equivalent, and so are diameters B and D of counter bore 852a. The engagement of the plug and fastener 910 with the internal walls 854a and 856a thereof is identical to that which was described in relation to plug and fastner 810. The plug and fastener 910 forms a first and second seal with the internal walls 854a and 856a employing the threaded portion 914 and sealing portion 916. This is shown in FIG. 18.

Figure 19:
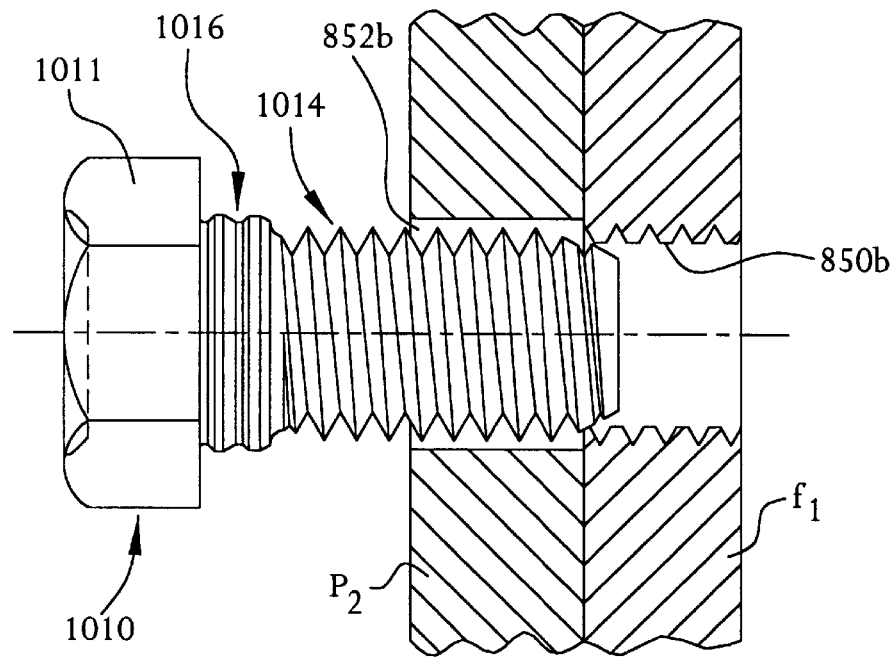
Figure 20:
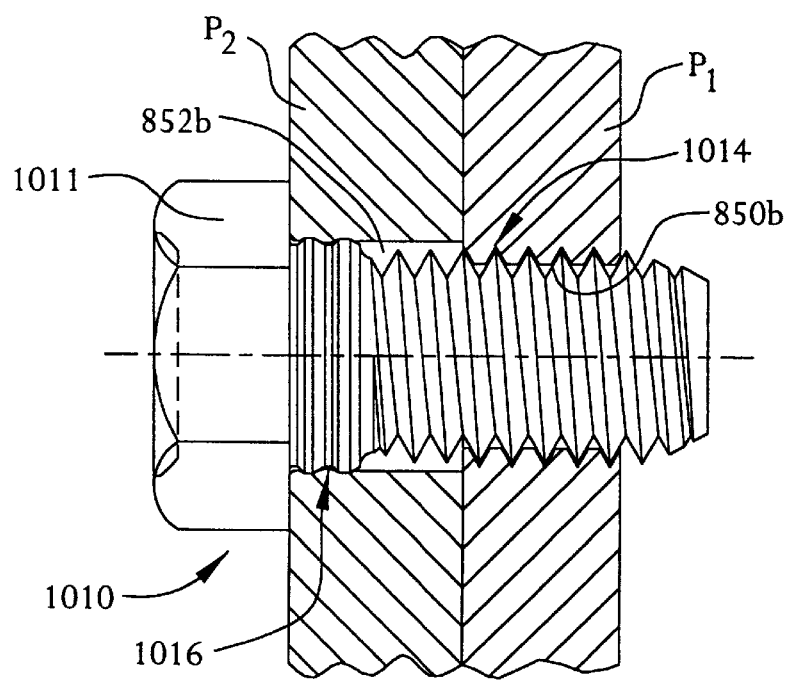

As shown in FIGS. 19 and 20, plug and fastener 1010 can be engaged in an opening 19 essentially provided by two workpieces $P_1$ and $P_2$ where the first workpiece $P_1$ provides a bore 850b and the second workpiece $P_2$ provides a counter bore 852b. Hence, as shown in FIG. 20, engagement of the plug and fastener 1010 in the opening 19 provides that the two workpieces $P_1$ and $P_2$ are secured together due to the engagement of the threaded portion 1014 with workpiece $P_1$ and the engagement of the sealing portion 1016 with workpiece $P_2$. Of course, the other embodiments previously described may also be so engaged with two workpieces in much the same manner to provide for securement thereof. As shown, the bore 850b provided in workpiece $P_1$ may be pre-threaded.

The plug and fastener 1110 illustrated in FIGS. 21–24 differs from plug and fastener 810 only in that the sealing portion 1116 of plug and fastener 1110 is comprised of a pair of sealing rings 1122 and 1124 where the longitudinal widths 1122a and 1122b thereof are substantially equal. However, it is preferred that, like plug and fastener 810, the diameters 1123, 1125 of the rings 1122, 1124 differ from each other and taper toward the threaded portion 1114. In other words, the sealing ring 1124 which is closer to the threaded portion 1114 preferably has a smaller diameter 1125 than does the diameter 1123 of sealing ring 1122 which is closer to the head portion 1111. Likewise, preferably leading faces 1122a and 1124a of the respective rings 1122 and 1124, form an angle of approximately 45° relative to the respective widths 1122b and 1124b in order to help minimize the resistance between these front faces as the seal rings 1122, 1124 embed and swage an internal surface of the opening 19 as will be described (for clarity, reference numerals 1122, 1124, 1122a, 1124a, 1122b, 1124b, 1123 and 1125 are indicated only in FIG. 11).

Figure 21:
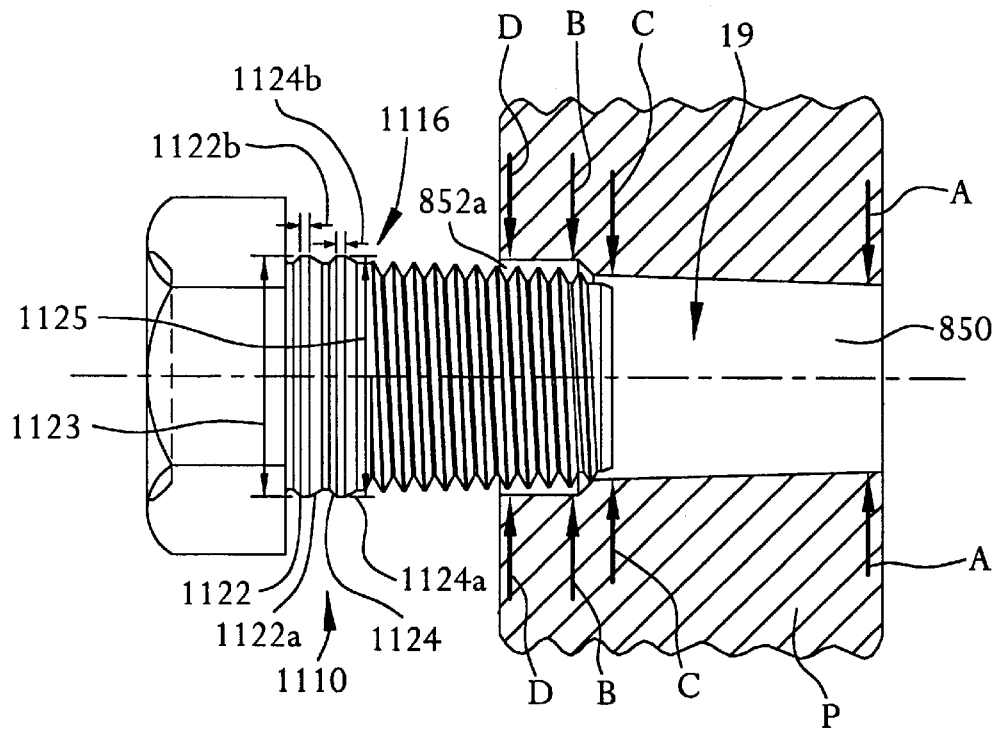
Figure 22:
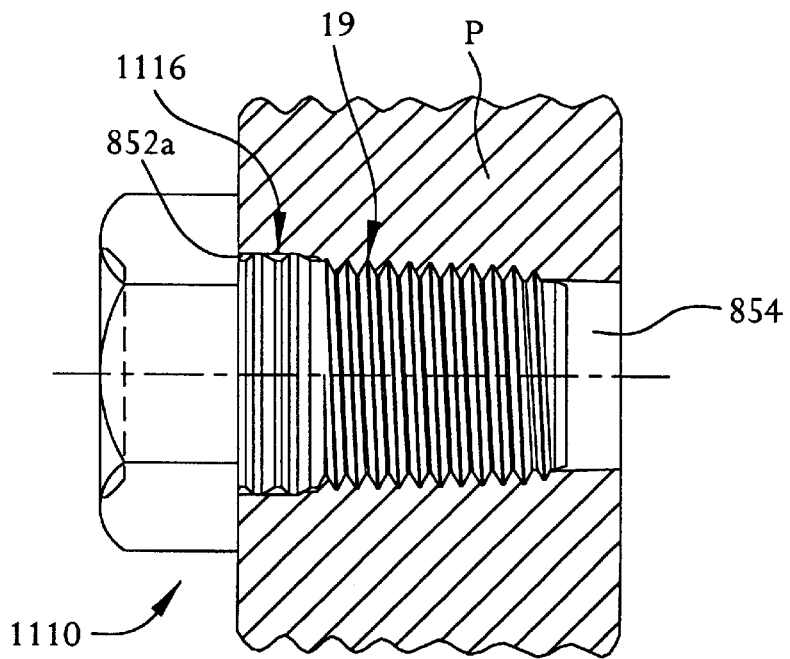
Figure 23:
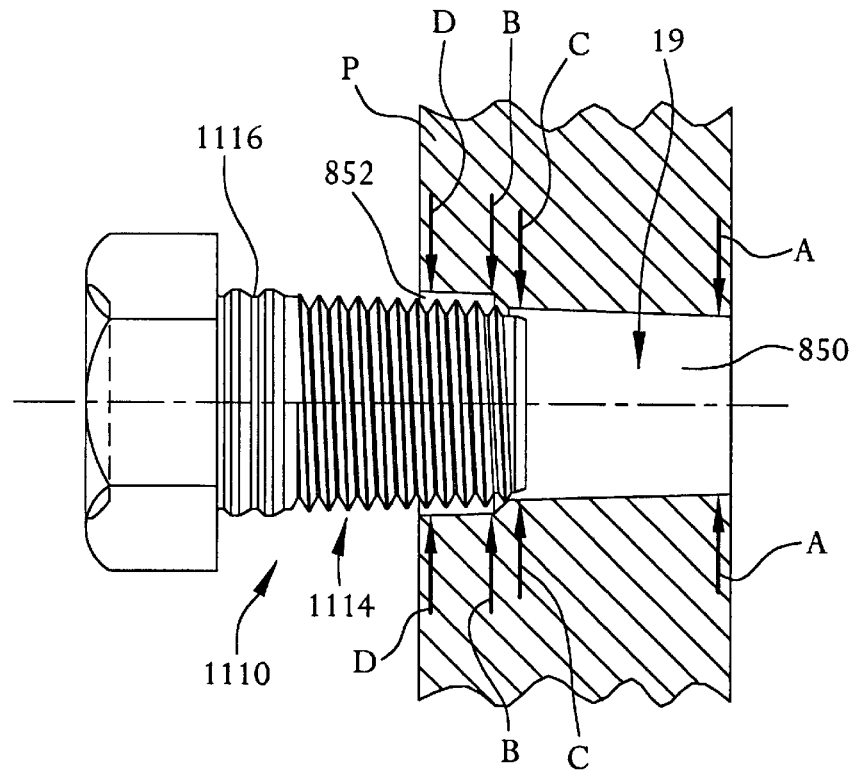
Figure 24:
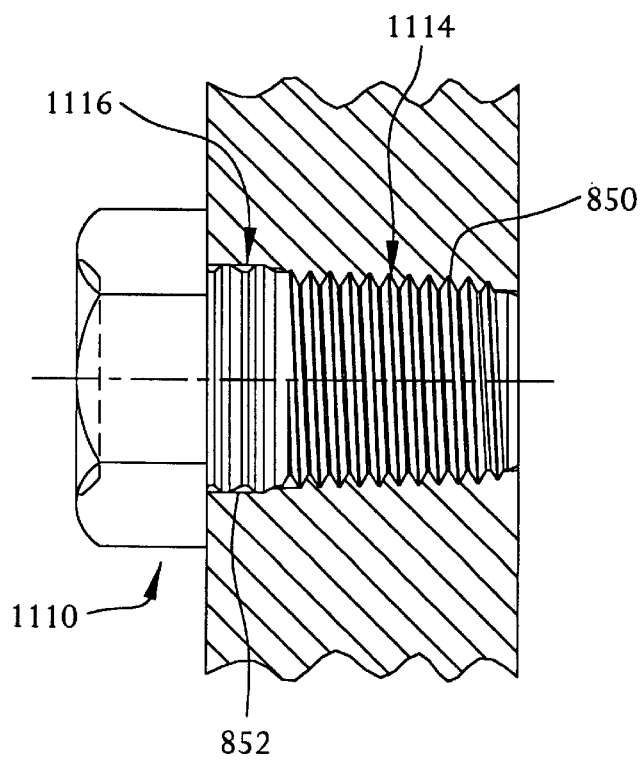

As shown in FIGS. 21 and 22, plug and fastener 1110 can be engaged with an opening 19 in a workpiece P where the opening is formed of a tapered bore 850 and a non-tapered counter bore 852a. In this case, as shown in FIG. 21, diameter A of bore 850 is less than diameter C, while diameters B and D of counter bore 852a are substantially equivalent. Alternatively, as shown in FIGS. 23 and 24, plug and fastener 1110 can be engaged with an opening 19 in a workpiece P where the opening is formed of a tapered bore 850 and a tapered counter bore 852. In this case, as shown in FIG. 23, diameters A and B are less than corresponding diameters C and D, respectively. Regardless, engagement of the plug and fastener 1110 therein is identical to that which was described in relation to plug and fastener 810. The plug and fastener 1110 preferably forms a first and second seal with the internal walls of the bore 850 and counter bore 852 employing the threaded portion 1114 and sealing portion 1116 thereof, as illustrated in FIGS. 22 and 24.

While preferred embodiments of the present invention are shown and described, it is envisioned that those skilled in the art may devise various modifications and equivalents without departing from the spirit and scope of the appended claims.

As for example, the configuration of the sealing end portion 16; 116; 216 etc. may take varying shape. The primary considerations are that the sealing end portion achieve interfering engagement with the bore wall to such an extent as to attain a seal. While deformation and cold-forming of the bore wall is preferred, it is not absolutely necessary to achieve a complete seal, however, deformation tends to produce interference which results in a seal. Further, while the thread-forming portions 14; 114; 214 etc., are disclosed to be formed as tri-lobular or tri-roundular in accordance with the well known TAPTITE® type of thread-forming design, other thread-forming configurations for threads 14; 114 etc., may be employed, these are also well-known in the art. The only requirement is that the thread-forming portions 14; 114 etc., produce the desired internal thread in accordance with the NPTF standards. Further, as discussed above, the plug 10; 110 . . . 710 may be used without a forward sealing portion 16; 116 . . . 716, or the forward sealing portion designs may be used on standard NPTF plugs.

The invention claimed is:

1. A combination plug and fastener for sealing in an opening in a workpiece, said plug and fastener comprising: a shank having a non-helical sealing portion comprising a plurality of non-helical sealing rings, a threaded portion, and a head portion, said sealing portion being between said head portion and said threaded portion, said threaded portion engaging with an internal wall of said opening and providing a first seal, said sealing portion configured to engage and provide a second seal against the internal wall of said opening.

2. A combination plug and fastener as recited in claim 1, wherein said sealing rings have respective outer diameters differentially dimensioned in relationship and tapering toward said threaded portion of said shank.

3. A combination plug and fastener as recited in claim 2, wherein said threaded portion of said shank is non-tapered.

4. A combination plug and fastener as recited in claim 2, wherein said threaded portion of said shank is tapered.

5. A combination plug and fastener as recited in claim 2, wherein each of said sealing rings has a longitudinally extending and generally radially uniform peripheral surface defining said differential diameters.

6. A combination plug and fastener as recited in claim 5, wherein each of said sealing rings further includes a longitudinally leading face extending angularly from said respective generally radially uniform peripheral surface.

7. A combination plug and fastener as recited in claim 3, said peripheral surfaces having differential longitudinal widths which are inversely proportional to the respective diameters of the sealing rings.

8. A combination plug and fastener as recited in claim 5, said peripheral surfaces having substantially identically sized longitudinal widths.

9. A joint structure comprising in combination a workpiece having an opening defined by a bore and a counter bore, and a combination plug and fastener for sealing in said opening in said workpiece, said combination plug and fastener comprising: a shank having a non-helical sealing portion comprising a plurality of non-helical sealing rings a threaded portion, and a head portion, said sealing portion being between said head portion and said threaded portion, said threaded portion engaging with an internal wall of said bore and providing a first seal, said sealing portion configured to engage against an internal wall of said counter bore and provide a second seal.

10. A joint structure as recited in claim 9, said bore and said counter bore each being tapered.

11. A joint structure as recited in claim 9, said bore and said counter bore each being non-tapered.

12. A joint structure as recited in claim 9, one of said bore and said counter bore being tapered and the other of said bore and said counter bore being non-tapered.

13. A joint structure as recited in claim 9, said bore being threaded for receiving said threaded portion of said shank.

14. A joint structure as recited in claim 10, said sealing portion comprising a plurality of longitudinally spaced annular sealing rings configured for respective sealing engagement of said internal wall of said tapered counter bore.

15. A joint structure as recited in claim 11, said sealing portion comprising a plurality of longitudinally spaced annular sealing rings configured for respective sealing engagement of said internal wall of said non-tapered counter bore.

16. A joint structure as recited in claim 14, wherein said sealing rings have respective outer diameters differentially dimensioned in relationship and tapering toward said threaded portion of said shank.

17. A joint structure as recited in claim 15, wherein said sealing rings have respective outer diameters differentially dimensioned in relationship and tapering toward said threaded portion of said shank.

18. A method of providing a seal between a combination plug and fastener and a workpiece having an opening therein, said method comprising the steps of: providing said combination plug and fastener, said combination plug and fastener having a shank having a non-helical sealing portion comprising a plurality of non-helical sealing rings, a threaded portion, and a head portion, said sealing portion being between said head portion and said threaded portion, said threaded portion engaging with an internal wall of said opening and providing a first seal, said sealing portion configured to engage and provide a second seal against the internal wall of said opening; providing said workpiece having said opening; engaging said combination plug and fastener in said opening and driving said combination plug and fastener into said opening such that said threaded portion enters said opening and engages said internal wall to provide a first seal and said sealing portion engages said internal wall to provide a second seal.

19. A combination plug and fastener for sealing in an opening in a workpiece, said plug and fastener comprising: a shank having a non-helical sealing portion and a threaded portion generally proximate said sealing portion and entering said opening, said threaded portion engaging with an internal wall of said opening and providing a first seal, said sealing portion configured to engage and provide a second seal against the internal wall of said opening, further comprising a head portion, said shank extending from said head portion, said sealing portion of said shank being between said head portion and said threaded portion of said shank, wherein said sealing portion comprises a plurality of longitudinally spaced annular sealing rings configured for respective sealing engagement of said internal wall of said opening, wherein said sealing rings have respective outer diameters differentially dimensioned in relationship and tapering toward said threaded portion of said shank, wherein said threaded portion of said shank is non-tapered.

20. A combination plug and fastener for sealing in an opening in a workpiece, said plug and fastener comprising: a shank having a non-helical sealing portion and a threaded portion generally proximate said sealing portion and entering said opening, said threaded portion engaging with an internal wall of said opening and providing a first seal, said sealing portion configured to engage and provide a second seal against the internal wall of said opening, further comprising a head portion, said shank extending from said head portion, wherein said sealing portion comprises a plurality of non-helical, longitudinally spaced annular sealing rings configured for respective sealing engagement of said internal wall of said opening.

21. A combination plug and fastener as recited in claim 20, wherein said sealing rings have respective outer diameters differentially dimensioned in relationship and tapering toward said threaded portion of said shank.

22. A combination plug and fastener as recited in claim 20, wherein said threaded portion of said shank is non-tapered.

23. A combination plug and fastener for sealing in an opening in a workpiece, said plug and fastener comprising: a shank having a non-helical sealing portion and a threaded portion generally proximate said sealing portion and entering said opening, said threaded portion engaging with an internal wall of said opening and providing a first seal, said sealing portion configured to engage and provide a second seal against the internal wall of said opening, further comprising a head portion, said shank extending from said head portion, said sealing portion of said shank being between said head portion and said threaded portion of said shank, wherein said sealing portion comprises a plurality of longitudinally spaced annular sealing rings configured for respective sealing engagement of said internal wall of said opening, wherein said sealing rings have respective outer diameters differentially dimensioned in relationship and tapering toward said threaded portion of said shank, wherein each of said sealing rings has a longitudinally extending and generally radially uniform peripheral surface defining said differential diameters, wherein each of said sealing rings further includes a longitudinally leading face extending angularly from said respective generally radially uniform peripheral surface.

24. A combination plug and fastener for sealing in an opening in a workpiece, said plug and fastener comprising: a shank having a non-helical sealing portion and a threaded portion generally proximate said sealing portion and entering said opening, said threaded portion engaging with an internal wall of said opening and providing a first seal, said sealing portion configured to engage and provide a second seal against the internal wall of said opening, further comprising a head portion, said shank extending from said head portion, said sealing portion of said shank being between said head portion and said threaded portion of said shank, wherein said sealing portion comprises a plurality of longitudinally spaced annular sealing rings configured for respective sealing engagement of said internal wall of said opening, wherein each of said sealing rings includes a longitudinally leading face extending angularly from a respective generally radially uniform peripheral surface.

25. A combination plug and fastener for sealing in an opening in a workpiece, said plug and fastener comprising: a shank having a non-helical sealing portion and a threaded portion generally proximate said sealing portion and entering said opening, said threaded portion engaging with an internal wall of said opening and providing a first seal, said sealing portion configured to engage and provide a second seal against the internal wall of said opening, further comprising a head portion, said shank extending from said head portion, said sealing portion of said shank being between said head portion and said threaded portion of said shank, wherein said sealing portion comprises a plurality of longitudinally spaced annular sealing rings configured for respective sealing engagement of said internal wall of said opening, wherein said sealing rings have respective outer diameters differentially dimensioned in relationship and tapering toward said threaded portion of said shank, wherein each of said sealing rings has a longitudinally extending and generally radially uniform peripheral surface defining said differential diameters, said peripheral surfaces having substantially identically sized longitudinal widths.

26. A combination plug and fastener for sealing in an opening in a workpiece, said plug and fastener comprising: a shank having a non-helical sealing portion and a threaded portion generally proximate said sealing portion and entering said opening, said threaded portion engaging with an internal wall of said opening and providing a first seal, said sealing portion configured to engage and provide a second seal against the internal wall of said opening, further comprising a head portion, said shank extending from said head portion, wherein said sealing portion comprises a plurality of longitudinally spaced annular sealing rings configured for respective sealing engagement of said internal wall of said opening, wherein said sealing rings have respective outer diameters differentially dimensioned in relationship.

27. A combination plug and fastener as recited in claim 26, wherein said sealing rings have respective outer diameters tapering toward said threaded portion of said shank, wherein each of said sealing rings has a longitudinally extending and generally radially uniform peripheral surface defining said differential diameters, said peripheral surfaces having substantially identically sized longitudinal widths.

* * * * *

UNITED STATES PATENT AND TRADEMARK OFFICE
CERTIFICATE OF CORRECTION

PATENT NO.    : 6,062,263
DATED         : May 16, 2000
INVENTOR(S)   : Steven P. Donovan Page 1 of 1

It is certified that error appears in the above-identified patent and that said Letters Patent is hereby corrected as shown below:

75 Inventors:   "Steven P. Donovan
                William R. Turnmire
                Lawrence Hutson"

Should be:
                -- Steven P. Donovan --

Signed and Sealed this

Third Day of July, 2001

*Attest:*

*Attesting Officer*

NICHOLAS P. GODICI
*Acting Director of the United States Patent and Trademark Office*